United States Patent
Bijja

(10) Patent No.: US 9,043,447 B2
(45) Date of Patent: May 26, 2015

(54) SIMPLIFYING SETUP OF MANAGEMENT SERVERS CONTROLLING ACCESS TO VOLUMINOUS CONFIGURATION DATA REQUIRED FOR APPLICATIONS

(75) Inventor: Rajesh Bijja, Bangalore (IN)

(73) Assignee: Oracle International Corporation, Redwood Shores, CA (US)

(*) Notice: Subject to any disclaimer, the term of this patent is extended or adjusted under 35 U.S.C. 154(b) by 1030 days.

(21) Appl. No.: 13/118,589

(22) Filed: May 31, 2011

(65) Prior Publication Data

US 2012/0311105 A1    Dec. 6, 2012

(51) Int. Cl.
*G06F 15/177*    (2006.01)
*G06F 9/445*    (2006.01)

(52) U.S. Cl.
CPC .................................. *G06F 9/44505* (2013.01)

(58) Field of Classification Search
USPC .................................................. 709/200, 220
See application file for complete search history.

(56) References Cited

U.S. PATENT DOCUMENTS

| | | | | |
|---|---|---|---|---|
| 7,454,743 B2* | 11/2008 | Fuchs | | 717/108 |
| 7,661,066 B2* | 2/2010 | Petrov et al. | | 715/736 |
| 7,703,019 B2* | 4/2010 | Petrov et al. | | 715/736 |
| 7,870,188 B2* | 1/2011 | Mazzitelli et al. | | 709/203 |
| 8,156,213 B1* | 4/2012 | Deng et al. | | 709/223 |
| 8,412,768 B2* | 4/2013 | Rajaraman et al. | | 709/203 |
| 2003/0182457 A1* | 9/2003 | Brewin | | 709/310 |
| 2004/0254944 A1* | 12/2004 | Simpson | | 707/100 |
| 2005/0216488 A1* | 9/2005 | Petrov et al. | | 707/100 |
| 2005/0216585 A1* | 9/2005 | Todorova et al. | | 709/224 |
| 2006/0026552 A1* | 2/2006 | Mazzitelli et al. | | 717/101 |
| 2007/0294704 A1* | 12/2007 | Stephen et al. | | 719/315 |
| 2008/0127076 A1* | 5/2008 | McArdle | | 717/120 |
| 2008/0134160 A1* | 6/2008 | Belapurkar et al. | | 717/154 |
| 2009/0125512 A1* | 5/2009 | Robertson et al. | | 707/5 |
| 2009/0300482 A1* | 12/2009 | Summers et al. | | 715/234 |
| 2010/0262902 A1* | 10/2010 | Burns | | 715/234 |
| 2011/0321011 A1* | 12/2011 | Selitser et al. | | 717/120 |
| 2012/0084306 A1* | 4/2012 | Merritt | | 707/756 |
| 2012/0159306 A1* | 6/2012 | Sharma et al. | | 715/234 |
| 2013/0339943 A1* | 12/2013 | Mallya | | 717/176 |

OTHER PUBLICATIONS

"GlassFish", Wikipedia, downloaded circa, Jul 4, 2011, pp. 1-2, available at http://en.wikipedia.org/wiki/GlassFish.

* cited by examiner

*Primary Examiner* — Anthony Mejia
(74) *Attorney, Agent, or Firm* — Narendra Reddy Thappeta

(57) ABSTRACT

An aspect of the present invention simplifies setup of management servers controlling access to voluminous configuration data required for applications. In one embodiment, a schema specifying the parameters (and the corresponding data types) in the configuration data is examined and a set of management interfaces is generated consistent with the corresponding data types based on the examining of the schema. The generated management interfaces are registered with a management server, such that the management server makes available to applications the values corresponding to the specified parameters according to the set of management interfaces.

17 Claims, 11 Drawing Sheets

```xml
<?xml version='1.0' encoding='UTF-8'?>
<appConfig appName="Commercial Application" xmlns="http://www.oracle.com/schema/com/app/config"
    xmlns:xsi="http://www.w3.org/2001/XMLSchema-instance"
    xsi:schemaLocation="http://www.oracle.com/schema/com/app/config app-config.xsd ">    410
  <appServer>weblogic</appServer>
  <database>oracle</database>
  <dbUser>scott</dbUser>
  <dbDriver>oracle.jdbc.OracleDriver</dbDriver>
  <dbUrl>jdbc:oracle:thin:@localhost:1521:sid</dbUrl>
  <isCachingRequired>true</isCachingRequired>
  <keystoreType>JKS</keystoreType>
  <keystoreName>default-keystore.jks</keystoreName>
  <appWebUrl>http://xyz.hostname.com:9999/myApp</appWebUrl>
  <notifyEmail>donotreply@domain.com</notifyEmail>

<runtimeConfig isClusterEnabled="false">    420
    <appRegisteredDir>/user/applications/app.ear</appRegisteredDir>
    <startOnDeployment>true</startOnDeployment>
  </runtimeConfig>

<dataConfig regenerateData="true">    430
    <purgeData>OBSOLETE_CACHED_DATA</purgeData>
    <uploadDataEnabled>true</uploadDataEnabled>
  </dataConfig>

</appConfig>
```

```xml
<?xml version="1.0" encoding="UTF-8"?>
<xs:schema xmlns:xs="http://www.w3.org/2001/XMLSchema"   ... jaxb:version="2.0">
```

450
```xml
<xs:element name="appConfig">
    <xs:complexType>
        <xs:sequence>
            <xs:element name="appServer" type="xs:string" default="weblogic" />
            <xs:element name="database" type="xs:string" default="oracle" />
            <xs:element name="dbUser" type="xs:string" />
            ...
            <xs:element name="notifyEmail" type="xs:string" default="donotreply@domain.com" />
            <xs:element name="runtimeConfig" type="RuntimeConfig" />
            <xs:element name="dataConfig" type="DataConfig" />
        </xs:sequence>
        <xs:attribute name="appName" type="xs:string" use="required" />
    </xs:complexType>
</xs:element>
```

460
```xml
<xs:complexType name="RuntimeConfig">
    <xs:sequence>
        <xs:element name="appRegisteredDir" type="xs:string" />
        <xs:element name="startOnDeployment" type="xs:boolean" />
    </xs:sequence>
    <xs:attribute name="isClusterEnabled" type="xs:boolean" use="required" />
</xs:complexType>
```

470
```xml
<xs:complexType name="DataConfig">
    <xs:sequence>
        <xs:element name="purgeData" type="xs:string" />
        <xs:element name="uploadDataEnabled" type="xs:boolean" />
    </xs:sequence>
    <xs:attribute name="regenerateData" type="xs:boolean" use="required" />
</xs:complexType>
</xs:schema>
```

```
package com.app.config;
import java.util.List;
...
public interface DataConfig                                  510
{
    public void setRegenerateData(boolean value);

public boolean isRegenerateData();

public void setPurgeData(java.lang.String value);

public java.lang.String getPurgeData();

public void setUploadDataEnabled(boolean value);

public boolean isUploadDataEnabled();
}
```

*FIG. 5A*

```
package com.app.config;
import java.util.ArrayList;
...
public class DataConfigImpl extends MElementBeanImpl implements com.app.config.DataConfig
{
...
```

```
public DataConfigImpl(MDSReference baseDocRef, MDSInstance instance)        520
{
    super(baseDocRef, "http://www.acme.com/schema/com/app/config", "DataConfig", instance, _getStaticTypeKey());   ← 525
}
```

```
public void setRegenerateData(boolean value)        540
{
    super._setAttribute("","regenerateData",(new java.lang.Boolean(value)));   ← 545
}
```

```
public boolean isRegenerateData()        560
{
    java.lang.Boolean obj = (java.lang.Boolean) super._getAttributeValue("", "regenerateData", null);
    if (obj != null)
    {
        return obj.booleanValue();
    }
    else
    {
        return false;
    }
}
```
...
}

*FIG. 5B*

```
package com.app.config.mbeans;
import javax.management.ObjectName;
...
@Description(resourceKey = "com.app.config.mbeans.ataConfigMXBean.description",
    resourceBundleBaseName = "com.app.config.mbeans.AppBundle")
public interface DataConfigMXBean {
    @Description(resourceKey = "com.app.config.mbeans.DataConfigMXBean.regenerateData",
        resourceBundleBaseName = "com.app.config.mbeans.AppBundle")
    @Visibility(VisibilityLevel.Basic)
    public void setRegenerateData(boolean value);

@Description(resourceKey = "com.app.config.mbeans.DataConfigMXBean.regenerateData",
        resourceBundleBaseName = "com.app.config.mbeans.AppBundle")
    @Visibility(VisibilityLevel.Basic)
    public boolean isRegenerateData();

@Description(resourceKey = "com.app.config.mbeans.DataConfigMXBean.purgeData",
        resourceBundleBaseName = "com.app.config.mbeans.AppBundle")
    @Visibility(VisibilityLevel.Basic)
    public void setPurgeData(java.lang.String value);

@Description(resourceKey = "com.app.config.mbeans.DataConfigMXBean.purgeData",
        resourceBundleBaseName = "com.app.config.mbeans.AppBundle")
    @Visibility(VisibilityLevel.Basic)
    public java.lang.String getPurgeData();
    ...
}
```

```
package com.app.config.mbeans.impl;

public class DataConfigMXBeanImpl extends PersistenceConfigMBeanSupport
        implements com.app.config.mbeans.DataConfigMXBean
{
    private com.app.config.DataConfig dataConfig;

public DataConfigMXBeanImpl(MBeanHelper helper) {
        super(helper);
        dataConfig = helper.getDataConfig();
    } public boolean isRegenerateData() {                         640
        return dataConfig.isRegenerateData();
    } public void setRegenerateData(boolean value) {
        dataConfig.setRegenerateData(value);
    } public String getPurgeData() {                              680
        return dataConfig.getPurgeData();
    } public void setPurgeData(String value) {
        dataConfig.setPurgeData(value);
    }

SIMPLIFYING SETUP OF MANAGEMENT SERVERS CONTROLLING ACCESS TO VOLUMINOUS CONFIGURATION DATA REQUIRED FOR APPLICATIONS

BACKGROUND OF THE INVENTION

1. Technical Field

The present disclosure relates to application configuration management, and more specifically to simplifying setup of management servers controlling access to voluminous configuration data required for applications.

2. Related Art

Applications are often deployed to serve a large user base (e.g., of the order of several hundreds or thousands, typically) and are generally required to provide high service levels (in terms of availability, etc.). The applications typically execute on application servers and are accessible from client systems or other applications, as is well known in the relevant arts.

Configuration data is often used for applications. The configuration data may include various parameters used during run-time (e.g., the maximum number of connections that can possibly be opened to a database application executing in another server, the minimum or maximum number of threads permitted to be run at any time instance, etc.) or even prior to the operation of an application (e.g., some parameters may specify which specific modules to load or not, the maximum memory space that can be used for processing a transaction, network ports to monitor for corresponding types of requests, etc.).

The configuration data is often voluminous, for example, due to the number of different applications deployed, or due to the complexity of one or more of such applications.

Management servers are often used to simplify access to such voluminous configuration data, typically by providing a pre-defined interface using which applications can access the desired parameters of the configuration data. The management servers may also be capable of communicating (to the applications) changes in the configuration data. Thus, the management servers control access to the configuration data, while simplifying the deployment and management of the applications.

However, management servers generally need to be setup before the above noted features are available to applications. Setting up a management server entails specifying to the management server the corresponding parameters of the configuration data that is of interest to each application, the format (e.g., data type such as integer/string) in which each parameter (or value) is to be made available to applications, etc.

It is often desirable that the setup of management servers be simplified, particularly when the configuration data is voluminous.

BRIEF DESCRIPTION OF THE DRAWINGS

Example embodiments of the present invention will be described with reference to the accompanying drawings briefly described below.

FIG. 4A depicts example configuration data stored in the form of an eXtensible Markup Language (XML) file in one embodiment.

FIG. 4B depicts a schema for the example configuration data of FIG. 4A, specified according to XML Schema Definition (XSD) format in one embodiment.

FIG. 5A depicts a Java interface generated for the schema of FIG. 4B, while FIG. 5B depicts a Java class generated as an implementation for the Java interface of FIG. 5A in one embodiment.

FIGS. 6A and 6B together depict a sample MBean class generated for accessing configuration data (e.g. shown in FIG. 4A) in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

1. Overview

An aspect of the present invention simplifies setup of management servers controlling access to voluminous configuration data required for applications. In one embodiment, a schema specifying the parameters (and the corresponding data types) in the configuration data is examined and a set of management interfaces is generated consistent with the corresponding data types based on the examining of the schema. The generated management interfaces are registered with a management server, such that the management server makes available to applications the values corresponding to the specified parameters according to the set of management interfaces.

The setup of the management server is accordingly simplified. Thereafter, in response to receiving request from a application for the value of a parameter according to a management interface, the management server inspects the configuration data to identify a value of the requested parameter and then provides the identified value to the application according to the management interface.

Several aspects of the present invention are described below with reference to examples for illustration. However, one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore, the features/aspects described can be practiced in various combinations, though only some of the combinations are described herein for conciseness.

2. Example Environment

Figure 1:
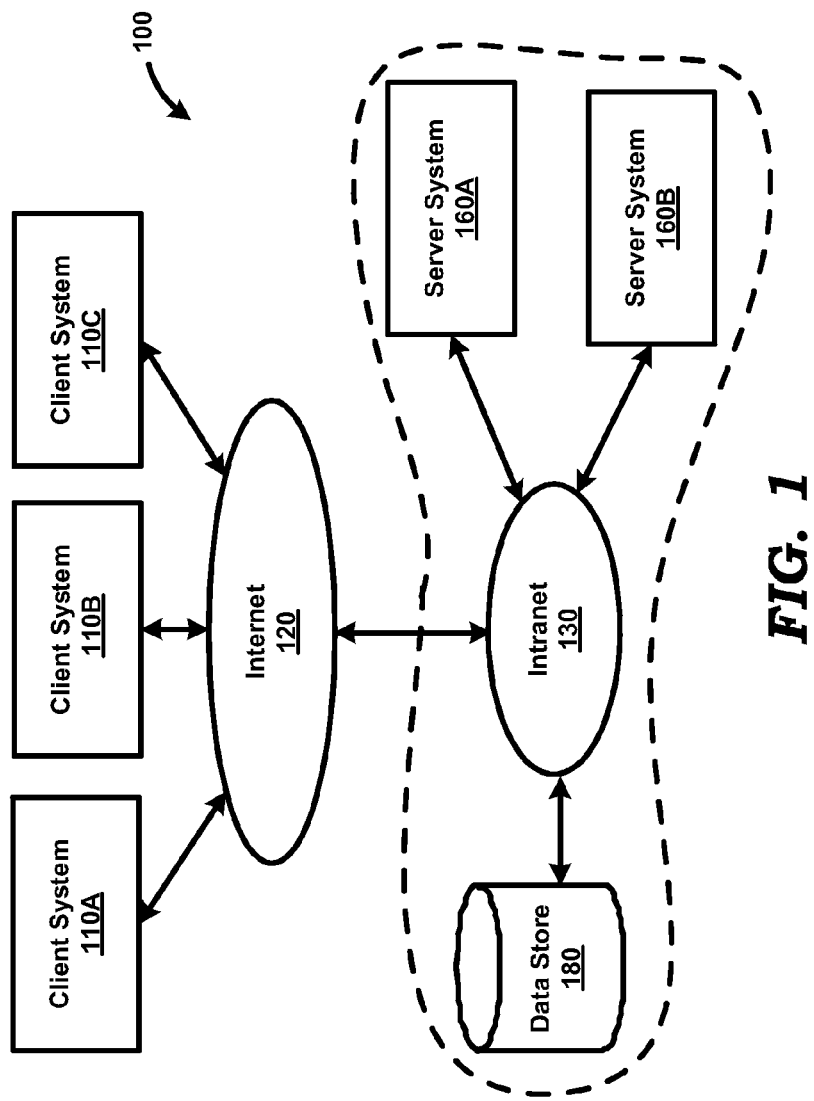
FIG. 1 is a block diagram illustrating an example environment (computing system) in which several aspects of the present invention can be implemented.

FIG. 1 is a block diagram illustrating an example environment (computing system 100) in which several aspects of the present invention can be implemented. The block diagram is shown containing client systems 110A-110C, Internet 120, intranet 130, server systems 160A-160B, and data store 180.

Merely for illustration, only representative number/type of systems is shown in FIG. 1. Many environments often contain many more systems, both in number and type, depending on the purpose for which the environment is designed. Each system/device of FIG. 1 is described below in further detail.

Intranet 130 represents a network providing connectivity between server systems 160A-160B, and data store 180 all provided within an enterprise (as indicated by the dotted boundary). Internet 120 extends the connectivity of these (and other systems of the enterprise) with external systems such as client systems 110A-110C.

Each of intranet 130 and Internet 120 may be implemented using protocols such as Transmission Control Protocol (TCP) and/or Internet Protocol (IP), well known in the relevant arts. In general, in TCP/IP environments, an IP packet is used as a basic unit of transport, with the source address being set to the IP address assigned to the source system from which the packet originates and the destination address set to the IP address of the target system to which the packet is to be eventually delivered. An IP packet is said to be directed to a target system when the destination IP address of the packet is set to the IP address of the target system, such that the packet is eventually delivered to the target system by Internet 120 and intranet 130. When the packet contains content such as port numbers, which specifies the target application, the packet may be said to be directed to such application as well.

Each of client systems 110A-110C represents a system such as a personal computer, workstation, mobile station, etc., used by end users to generate (user) requests directed to business/enterprise applications executing in server systems 160A-160B. The requests may be generated using appropriate user interfaces. In general, a client system requests an application for performing desired tasks and receives corresponding responses containing the results of performance of the requested tasks. Each request is sent in the form of an IP packet directed to the desired server system, with the IP packet including data identifying the desired tasks in the payload portion.

Data store 180 represents a non-volatile (persistent) storage facilitating storage and retrieval of a collection of data by business/enterprise applications executing in server systems 160A-160B. Data store 180 may be implemented as a database server using relational database technologies and accordingly provide storage and retrieval of data using structured queries such as SQL (Structured Query Language). Alternatively (or in addition), data store 180 may be implemented as a file server providing storage and retrieval of data in the form of files organized as one or more directories, as is well known in the relevant arts.

Each of server systems 160A-160B represents a server, such as a web/application server, executing business/enterprise applications capable of performing tasks (e.g., processing requests) requested by users using one of client systems 110A-110C. A server system may use data in data store 180 or that received from external sources (e.g., from the user) in performing such tasks. The server system then sends the result of performance of the tasks to the requesting client system.

It may be appreciated that the applications executing on the server systems may need to be configured for desired operation of the server systems. The manner in which such configuration is controlled in an embodiment is described below.

3. Controlling Configuration

Figure 2:
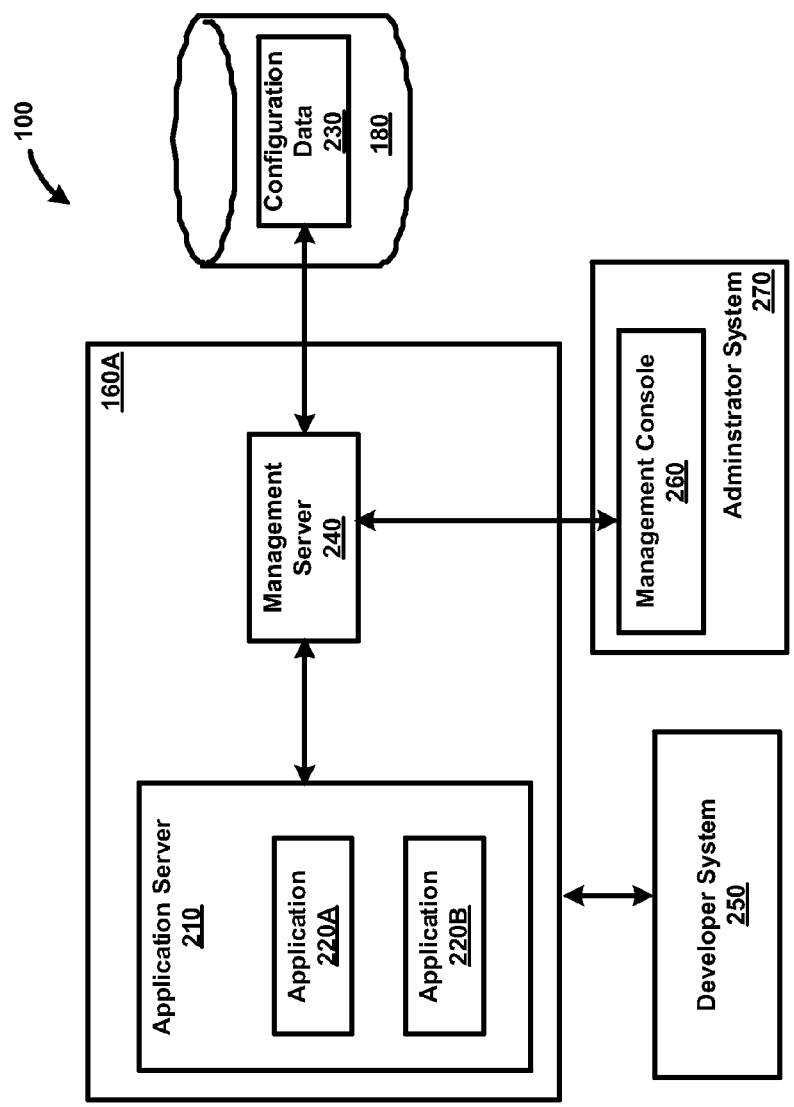
FIG. 2 is a block diagram depicting additional details of the computing system of FIG. 1, illustrating the manner in which configuration of applications is controlled in one embodiment.

FIG. 2 is a block diagram depicting additional details of computing system 100 of FIG. 1, illustrating the manner in which configuration of applications is controlled in one embodiment. Server system 160A is shown executing applications 220A and 220B in the context of application server 210. Management server 240 is also shown executing within server system 160A, though alternative embodiments may be implemented with management server 240 being external to server system 160, or within the context of application server 210.

It should be appreciated that application server 210 provides an operating environment for execution of various enterprise/business applications (220A/220B, together or individually referred to as 220, as will be clear from the context). In particular, application server 210 facilitates the applications to perform various tasks noted above. Application server 210 may be implemented using widely available software products such as BEA/Oracle Weblogic Server available from Oracle Corporation, USA.

Configuration data 230 is shown stored in data store 180, and is required for the appropriate operation of various applications 220 executing in the context of application server 210. As noted above in the background section, the configuration data may include various parameters used during run-time of the applications or prior thereto (i.e., when the applications are being initialized or started up).

Management server 240 controls access to configuration data 230. Each application 220 is designed to access (read and/or write) desired configuration parameters (i.e., values) by interfacing with management server 240. Thus, a developer of applications 220 is generally required to specify the configuration parameters required for each application.

Management server 240 also enables administrators (of the business/enterprise) to configure (set the values of) the desired configuration parameters stored in configuration data 230. For example, an administrator may use management console 260 executing in administrator system 270 to view and/or modify the configuration parameters, as desired. An example for a management console is Oracle Enterprise Manager available from Oracle Corporation, USA. While management console is shown in administrator system 270, in alternative embodiments, the management console may be provided by application server 210.

Management server 240 may be is generally implemented consistent with application server 210. For example, when application server 210 is implemented as Weblogic server or any server supporting JMX (Java Management Extensions), management server 240 can be implemented as a management bean (MBean) server.

In one prior approach, the developer may be is required to further specify the specific interface by which the corresponding applications 220 and also management console 260 may access the required configuration parameters. Such a manual approach may be time consuming and laborious, and thus undesirable in several situations. The problems are exacerbated when a developer wishes to execute the same application on different application servers (e.g., IBM's Websphere) since the interfaces required in by the different application/management servers may be different.

Several aspects of present invention address such problems as described below. The features are described with reference to developer system 250, which may also be used by a developer for developing the applications and specifying the configuration parameters required for the applications.

4. Simplifying Setup Of Management Server

Figure 3:
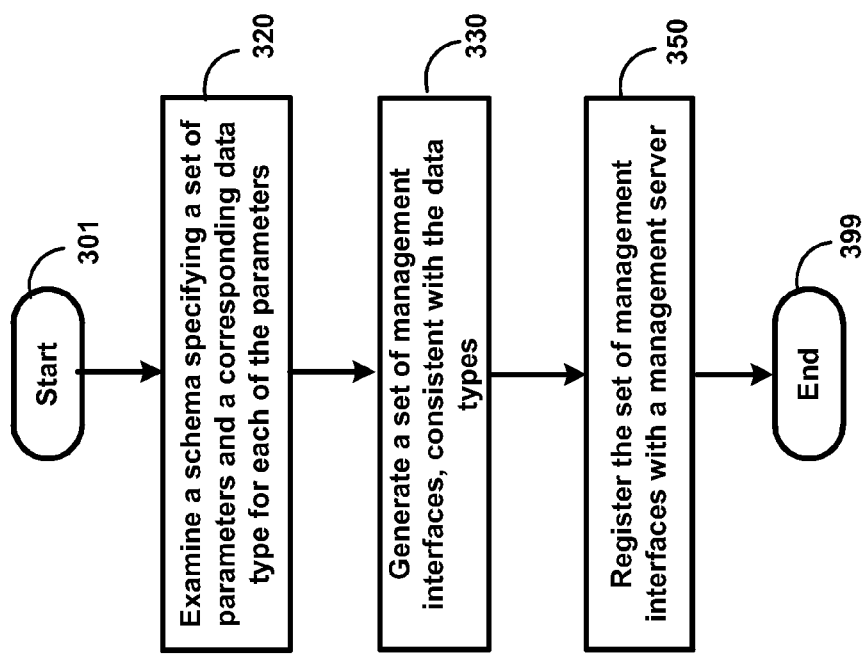
FIG. 3 is a flow chart illustrating the manner in which setup of a management server is simplified according to an aspect of the present invention.

FIG. 3 is a flow chart illustrating the manner in which setup of a management server is simplified according to an aspect of the present invention. The flowchart is described with respect to FIG. 2 merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 301, in which control immediately passes to step 320.

In step 320, developer system 250 examines a schema specifying a set of parameters and a corresponding data type for each of the parameters. A schema defines a structure for representing parameters and corresponding values in configuration data 230 stored on data store 180. For example, when the configuration data is stored in the form of XML, the schema may specify the tags (names) associated with each parameter, the hierarchy of the tags/values, the data types (e.g., string, integer, boolean, etc.), etc., as is well known in the relevant arts. As another example, if the configuration data is stored in the form of a table in a relational database, the structure may have details on the names of various columns, the data type of each column, etc.

In step 330, developer system 250 generates a set of management interfaces, consistent with the data types, based on examination of the schema (step 320). Each management interface defines programming language statements (e.g., in the form of corresponding procedures) for accessing the corresponding configuration parameters. It should be appreciated that each management interface may provide access to only a subset of the set of parameters, but all the management interfaces together provide access to all the parameters in the set specified by the schema.

It may be further appreciated that the programming language statements may be generated consistent with the data types specified for each parameter in the schema.

In step 350, developer system 250 registers the generated set of management interfaces with management server 240. Registering entails storing data representing the generated management interfaces in appropriate storage locations, such that management server 240 thereafter makes available (to applications 220) the values of the parameters according to the respective generated management interfaces. The flowchart ends in step 399.

It may be appreciated that the management interfaces are generated in an automated manner using the information contained in the schema. Accordingly, the burden on the developer may be substantially reduced. Furthermore, the registration of the management interfaces also can be automated such that the setup of management server 240 is simplified.

In addition, any differences in programming language statements, as may be required for different application/management servers, may be incorporated into step 330 such that the generation of the management interfaces for different application/management servers also is simplified for developers.

The description is continued with respect to the manner in which some example management interfaces are generated, and thereafter on how applications may access the parameters after registration.

5. Generating Example Management Interfaces

FIGS. 4A-6B together illustrate the manner in which management interfaces are generated (by developer system 250) in an embodiment. Each figure is described in detail below.

FIG. 4A depicts example configuration data stored in the form of an eXtensible Markup Language (XML) file on data store 180. The configuration data corresponds to a product entitled, "Oracle Identity Manager" available from Oracle Corporation.

Data portions 410, 420 and 430 are corresponding example portions of configuration data that are of interest to an application. Each portion is shown having a corresponding name, multiple parameters, and corresponding values. For example, data portion 430 is named 'dataConfig' and includes parameters regenerateData (set to value "true"), purgeData (set to value 'OBSOLETE_CACHED_DATA'), and uploadDataEnabled (set to value 'true').

FIG. 4B depicts a schema for the example configuration data of FIG. 4A, specified according to XML Schema Definition (XSD) format in one embodiment. Data portions 450, 460 and 470 respectively define the structure (the specific tags, the hierarchy of the tags/values, data types, etc.) for the data portions 410, 420 and 430 of FIG. 4A. It may be observed that data portion 470 (specifying the structure for dataConfig portion 430) indicates the data types such as xs:string and xs:boolean of the corresponding parameters.

In an embodiment, the examination of the schema (step 310) is performed by first converting the XSD schema of FIG. 4B to programming language statements (Java Classes). Such conversion may be performed by using tools such as a Java Architecture for XML Binding (JAXB) Parser, widely available in the market place. The sample converted Java JAXB classes generated by the JAXB parser are depicted in FIGS. 5A and 5B.

Data portion 510 of FIG. 5A depicts a Java interface generated for the schema of FIG. 4B and accordingly defines various procedures for setting and getting the parameter values. For example, setRegenerateData and is RegenerateData represent the respective procedures for setting and getting values for the configuration parameter regenerateData, and may be generated based on data portion 470. It may be observed that that the data type "boolean" of the inputs/outputs of the procedures is generated consistent with the data type xs:boolean of the parameter.

FIG. 5B depicts a Java class generated as an implementation for the Java interface of FIG. 5A. In particular, data portion 520 contains Java programming statements for creating an instance of the class, while data portions 540 and 560 respectively contain Java programming statements for implementing setRegenerateData and is RegenerateData procedures. It may be further observed that the text "DataConfig" in line 525 and the text "regenerateData" in line 545 together indicate the specific data portion 470 and the specific parameter to be accessed.

The JAXB classes for other data portions in the schema of FIG. 4B may be similarly generated. Developer system 250 then inspects these JAXB classes (using reflection techniques well known in Object oriented programming environments) to determine the parameters and corresponding data types and then generates MBean classes based on the determined information, as explained below with examples.

FIGS. 6A and 6B together depict a sample MBean class generated for accessing configuration data 230 (in particular, DataConfig data portion 430) stored on data store 180. The MBean class is generated based on reflection of the JAXB classes shown in FIGS. 5A and 5B. Data portion 610 of FIG. 6A corresponds to data portion 510 of FIG. 5A with addition of annotations/statements by developer system 250. Data portion 610 represents a sample of the management interface referred to in step 330 above. It may be observed that the management interface includes programming language statements (in the form of procedure names such as setRegenerateData and is RegenerateData) for accessing the values of the configuration parameters. FIG. 6B depicts a Java class generated as an implementation for the interface of FIG. 6A. Data portions 640 and 680 of FIG. 6B include statements for implementing the procedures specified in the interface of FIG. 6A. Similarly, the management interfaces/MBeans for other data portions of the configuration data shown in FIG. 4A may be generated by inspecting the corresponding JAXB classes.

6. Registering the Management Interfaces

Once the management interfaces are generated, developer system 250 may register the management interfaces with management server 240. In one embodiment, developer system 250 generates code for a ServletContext listener which is designed to register all the MBean (management interface) names present in the generated set (FIG. 6A/6B) as a part of a contextInitialized( )method and de-registers all the MBeans as a part of a contextDestroyed( ) method.

Developer system 250 then packages all the JAXB/management interface classes, the listeners, and relevant deployment descriptors (also generated by developer system 250) as a part of the deployable business/enterprise application (e.g., Oracle Identity Manager). The packaged application may then be deployed in application server 210.

Upon deployment, the listeners noted above causes MBeans to be registered with management server 240 (when the listeners is notified by the management server), such that management server 240 thereafter makes available to applications 220, the values of the parameters (e.g., regenerateData) according to the respective generated management interfaces (e.g., MBean of FIGS. 6A/6B).

7. Accessing Configuration Data

Management server 240 thereafter is ready to control/permit access to the configuration data 230, in particular the data portions shown in FIG. 4A. Thus, application 220A may invoke the method is RegenerateData (shown in portion 640) for accessing (to request) the value of the parameter regenerateData. In response, management server 240 inspects the configuration data to identify a value (true) of the parameter. The identified value is provided to application 220A according to the registered management interface as a response to the request.

Figure 7:
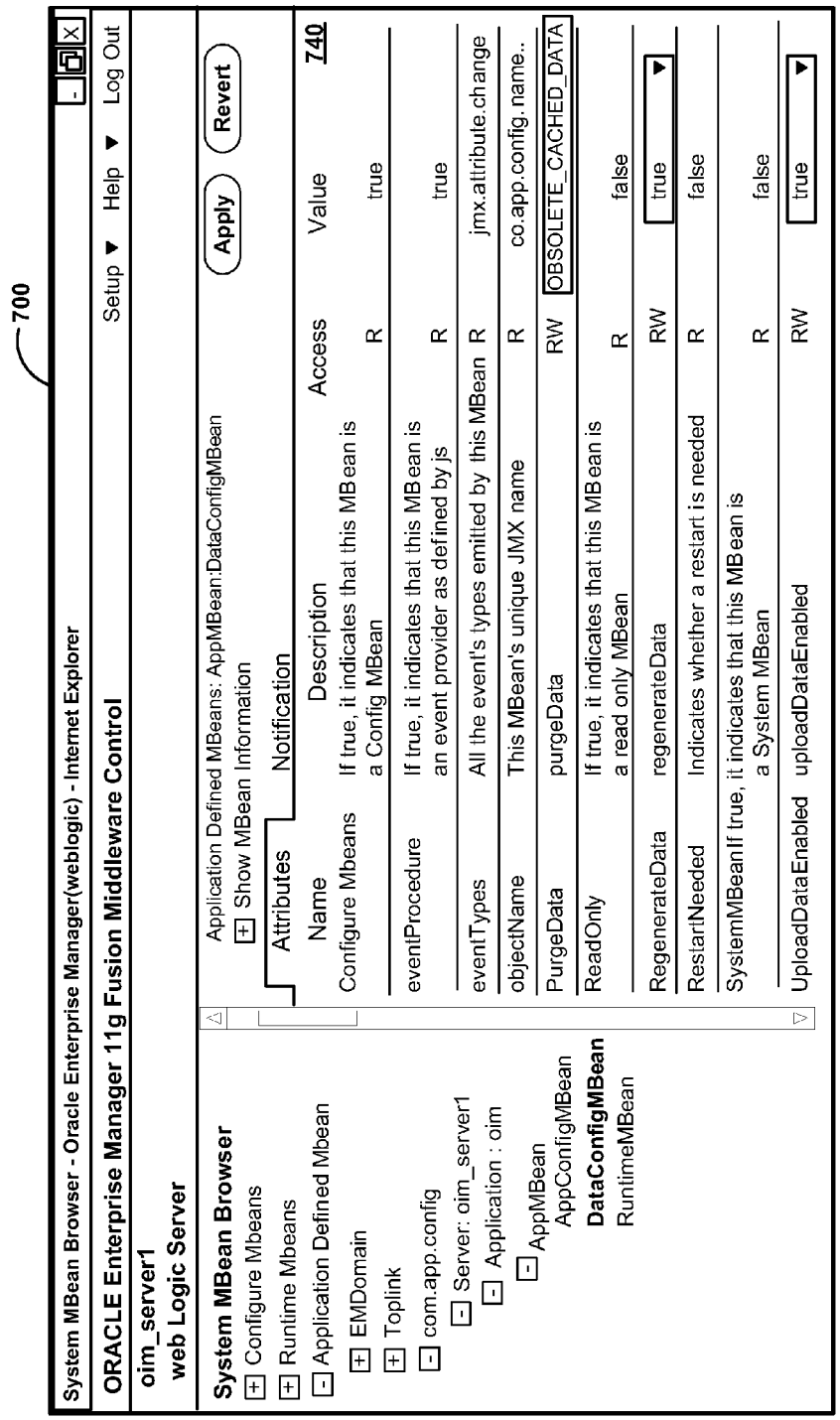
FIG. 7 depicts a portion of a user interface displayed by a management console application to facilitate administrators to manage the configuration of the applications in one embodiment.

As noted above, the management server 240 also facilitates an administrator to access the configuration data using management console 270. An example screenshot of a management console is depicted in FIG. 7. Display area 700 represents a portion of a user interface displayed by a management console application such as Oracle Enterprise Manager noted above. Display area 740 displays the various parameters of data portion 430, and also enables the administrator to modify some of the values (using the drop down lists shown there).

It should be appreciated that the different applications 220A and 220B can operate with corresponding schemas for the same parameters. For example, application 220A may operate according to a first schema illustrated above in FIG. 4B, in which parameter regenerateData is defined to be of data type Boolean.

On the other hand, application 220B may operate according to another schema in which the same parameter is defined to be a string. In such a situation, the corresponding JAXB classes of FIGS. 5A and 5B, and also MBean classes of FIGS. 6A and 6B may be generated with the parameter being accessible as a string.

It should be further appreciated that the features described above can be implemented in various embodiments as a desired combination of one or more of hardware, executable modules, and firmware. The description is continued with respect to an embodiment in which various features are operative when the software instructions described above are executed.

7. Digital Processing System

Figure 8:
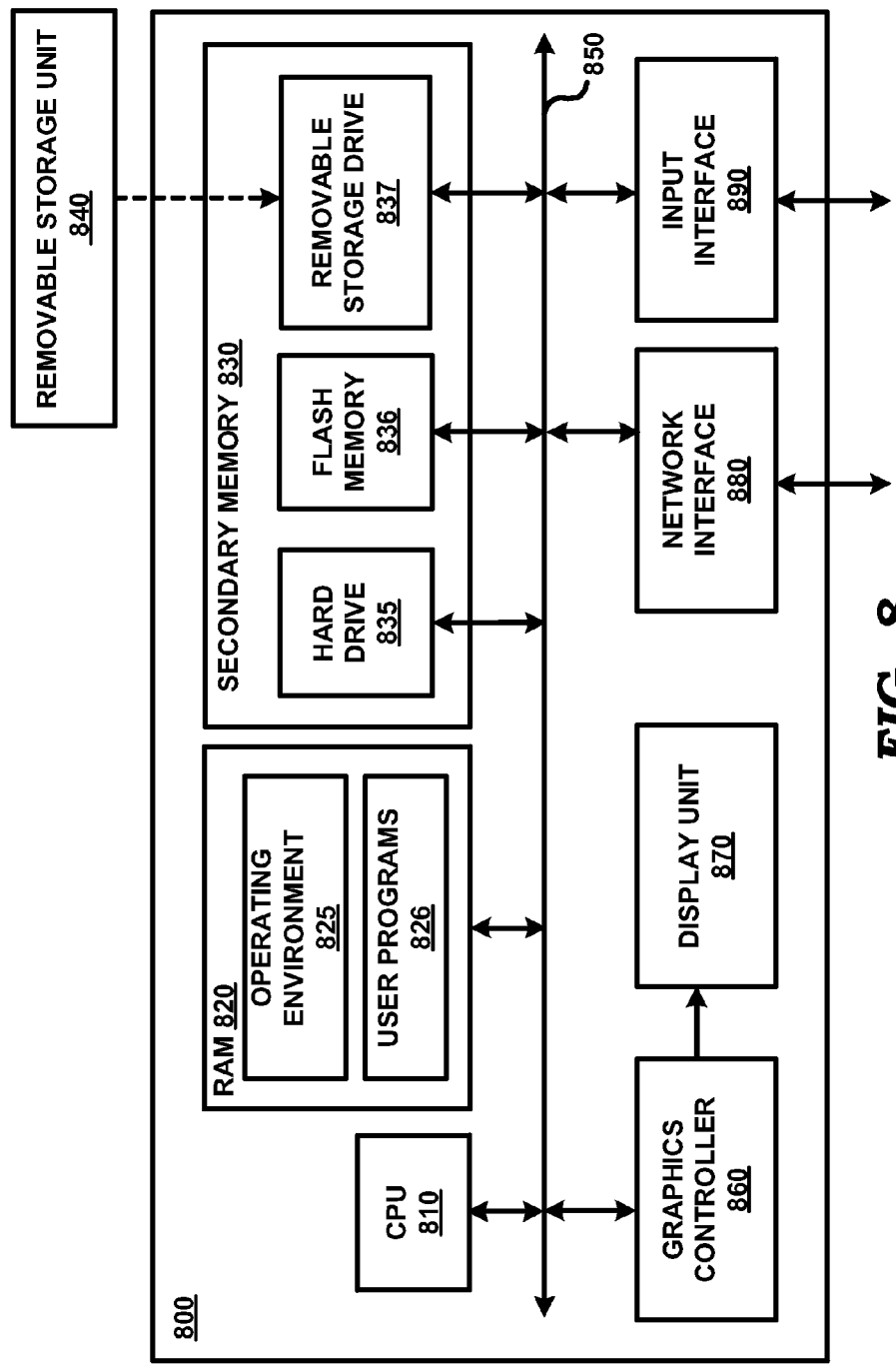
FIG. 8 is a block diagram illustrating the details of a digital processing system in which various aspects of the present invention are operative by execution of appropriate executable modules.

FIG. 8 is a block diagram illustrating the details of digital processing system 800 in which various aspects of the present invention are operative by execution of appropriate executable modules. Digital processing system 800 may correspond to any system (such as server system 160A) executing the enterprise compensation application or the client system (110A-110C) providing the corresponding user interface.

Digital processing system 800 may contain one or more processors (such as a central processing unit (CPU) 810), random access memory (RAM) 820, secondary memory 830, graphics controller 860, display unit 870, network interface 880, and input interface 890. All the components except display unit 870 may communicate with each other over communication path 850, which may contain several buses as is well known in the relevant arts. The components of FIG. 8 are described below in further detail.

CPU 810 may execute instructions stored in RAM 820 to provide several features of the present invention. CPU 810 may contain multiple processing units, with each processing unit potentially being designed for a specific task. Alternatively, CPU 810 may contain only a single general-purpose processing unit.

RAM 820 may receive instructions from secondary memory 830 using communication path 850. RAM 820 is shown currently containing software instructions constituting shared environment 825 and/or user programs 826 (such as networking applications, database applications, etc.). Shared environment 825 contains utilities shared by user programs, and such shared utilities include operating system, device drivers, virtual machines, flow engine, etc., which provide a (common) run time environment for execution of user programs/applications.

Graphics controller 860 generates display signals (e.g., in RGB format) to display unit 870 based on data/instructions received from CPU 810. Display unit 870 contains a display screen to display the images defined by the display signals (such as the user interfaces shown in FIGS. 3A-3C and 4A-4B). Input interface 890 may correspond to a keyboard and a pointing device (e.g., touch-pad, mouse) and may be used to provide the user inputs required for several aspects of the present invention (such as those provided for interacting with the user interfaces shown in FIGS. 3A-3C and 4A-4B). Network interface 880 provides connectivity to a network (e.g., using Internet Protocol), and may be used to communicate with other connected systems (such as client systems 110A-110C, data store 180, etc.) of FIG. 1.

Secondary memory 830 (representing a non-transitory storage/medium) may contain hard drive 835, flash memory 836, and removable storage drive 837. Secondary memory 830 may store the data (for example, data indicating the custom filters created by each user) and software instructions (for example, for performing the steps of FIG. 2), which enable digital processing system 800 to provide several features in accordance with the present invention.

Some or all of the data and instructions may be provided on removable storage unit 840, and the data and instructions may be read and provided by removable storage drive 837 to CPU 810. Floppy drive, magnetic tape drive, CD-ROM drive, DVD Drive, Flash memory, removable memory chip (PCMCIA Card, EPROM) are examples of such removable storage drive 837.

Removable storage unit 840 may be implemented using medium and storage format compatible with removable storage drive 837 such that removable storage drive 837 can read the data and instructions. Thus, removable storage unit 840 includes a computer readable storage medium having stored therein computer software and/or data. However, the computer (or machine, in general) readable storage medium can be in other forms (e.g., non-removable, random access, etc.).

In this document, the term "computer program product" is used to generally refer to removable storage unit 840 or hard disk installed in hard drive 835. These computer program products are means for providing software to digital processing system 800. CPU 810 may retrieve the software instructions, and execute the instructions to provide various features of the present invention described above.

It should be understood that numerous specific details, relationships, and methods are set forth to provide a full understanding of the invention. For example, many of the functions units described in this specification have been labeled as modules/blocks in order to more particularly emphasize their implementation independence.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

7. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method of controlling access to a configuration data required for applications, said configuration data containing the respective values for a plurality of parameters, said method comprising:

examining a first schema and a second schema, said first schema specifying a first set of parameters of interest to a first application and a corresponding data type for each of said first set of parameters, said second schema specifying a second set of parameters of interest to a second application and a corresponding data type for each of said second set of parameters, said first set of parameters and said second set of parameters being contained in said plurality of parameters, wherein both of said first set of parameters and said second set of parameters contain a first parameter, wherein said first schema and said second schema respectively specifies a first data type and a second data type for said first parameter;

generating a first set of management interfaces and a second set of management interfaces, wherein each management interface in said first set of management interfaces is generated consistent with the corresponding data type based on said examining of said first schema, wherein each management interface in said second set of management interfaces is generated consistent with the corresponding data type based on said examining of said second schema; and registering said first set of management interfaces and said second set of management interfaces with a management server, wherein, upon said registering, said management server makes available to applications the values corresponding to said first set of parameters according to said first set of management interfaces, wherein said management server makes available a first value for said first parameter according to said first data type to said first application, and said first value for said first parameter according to said second data type to said second application.

2. The method of claim 1, wherein said making available comprises:

receiving in said management server, a first request from said first application and a second request from a second application, both of said first request and said second request being for the value of said first parameter;

inspecting said configuration data to identify said first value of said first parameter; and providing, to said first application, said first value according to said first data type as a first response to said first request, wherein said providing provides, to said second application, said first value according to said second data type as a second response to said second request.

3. The method of claim 2, wherein said configuration data is in the form of eXtensible Markup Language (XML) and each of said first schema and said second schema are specified according to XML Schema Definition (XSD) format.

4. The method of claim 3, wherein said examining comprises:

converting said first schema into a set of Java Architecture for XML Binding (JAXB) classes; and inspecting said set of JAXB classes to determine said first set of parameters and said corresponding data type for each of said first set of parameters.

5. The method of claim 3, wherein said first application is an enterprise application executing in a application server and said second application is a management application that enables administrators to manage said configuration data of said enterprise application executing in said applications server.

6. The method of claim 5, wherein said application server is implemented to support Java Management Extensions (JMX), said management server is implemented as a management bean (MBean) server and wherein each of said first set of management interfaces and said second set of management interfaces is provided as a corresponding MBean.

7. A non-transitory machine readable medium storing one or more sequences of instructions for causing a system to control access to a configuration data required for applications, said configuration data containing the respective values for a plurality of parameters, wherein execution of said one or more sequences of instructions by one or more processors contained in said system causes said system to perform the actions of:

examining a first schema and a second schema, said first schema specifying a first set of parameters of interest to a first application and a corresponding data type for each of said first set of parameters, said second schema specifying a second set of parameters of interest to a second application and a corresponding data type for each of said second set of parameters, said first set of parameters and said second set of parameters being contained in said plurality of parameters, wherein both of said first set of parameters and said second set of parameters contain a first parameter, wherein said first schema and said second schema respectively specifies a first data type and a second data type for said first parameter;

generating a first set of management interfaces and a second set of management interfaces, wherein each management interface in said first set of management interfaces is generated consistent with the corresponding data type based on said examining of said first schema, wherein each management interface in said second set of management interfaces is generated consistent with the corresponding data type based on said examining of said second schema; and registering said first set of management interfaces and said second set of management interfaces with a management server, wherein, upon said registering, said management server makes available to applications the values corresponding to said first set of parameters according to said first set of management interfaces, wherein said management server makes available a first value for said first parameter according to said first data type to said first application, and said first value for said first parameter according to said second data type to said second application.

8. The machine readable medium of claim 7, wherein said making available comprises one or more instructions for:

receiving in said management server, a first request from said first application and a second request from a second application, both of said first request and said second request being for the value of said first parameter;

inspecting said configuration data to identify said first value of said first parameter; and providing, to said first application, said first value according to said first data type as a first response to said first request, wherein said providing provides, to said second application, said first value according to said second data type as a second response to said second request.

9. The machine readable medium of claim 8, wherein said configuration data is in the form of eXtensible Markup Language (XML) and each of said first schema and said second schema are specified according to XML Schema Definition (XSD) format.

10. The machine readable medium of claim 9, wherein said examining comprises one or more instructions for:

converting said first schema into a set of Java Architecture for XML Binding (JAXB) classes; and inspecting said set of JAXB classes to determine said first set of parameters and said corresponding data type for each of said first set of parameters.

11. The machine readable medium of claim 9, wherein said first application is an enterprise application executing in a application server and said second application is a management application that enables administrators to manage said configuration data of said enterprise application executing in said applications server.

12. The machine readable medium of claim 11, wherein said application server is implemented to support Java Management Extensions (JMX), said management server is implemented as a management bean (MBean) server and wherein each of said first set of management interfaces and said second set of management interfaces is provided as a corresponding MBean.

13. A system comprising:

an application server containing a processor and a memory, said memory storing instructions constituting applications including a first application and a second application, said processor to retrieve and to execute the instructions constituting the applications;

a data store to store a configuration data required for said applications, said configuration data containing the respective values for a plurality of parameters;

a management server to control access to said configuration data;

a developer system operable to:

examine a first schema and a second schema, said first schema specifying a first set of parameters of interest to said first application and a corresponding data type for each of said first set of parameters, said second schema specifying a second set of parameters of interest to said second application and a corresponding data type for each of said second set of parameters, said first set of parameters and said second set of parameters being contained in said plurality of parameters, wherein both of said first set of parameters and said second set of parameters contain a first parameter, wherein said first schema and said second schema respectively specifies a first data type and a second data type for said first parameter;

generate a first set of management interfaces and a second set of management interfaces, wherein each management interface in said first set of management interfaces is generated consistent with the corresponding data type based on said examining of said first schema, wherein each management interface in said second set of management interfaces is generated consistent with the corresponding data type based on said examining of said second schema; and register said first set of management interfaces and said second set of management interfaces with a management server, wherein, upon said register, said management server makes available to applications the values corresponding to said first set of parameters according to said first set of management interfaces, wherein said management server makes available a first value for said first parameter according to said first data type to said first application, and said first value for said first parameter according to said second data type to said second application.

14. The system of claim 13, wherein for said making available, said management server is operable to:

receive from said first application and said second application executing in said application server, a first request and a second request respectively for the value of said first parameter;

inspect said configuration data to identify said first value of said first parameter; and provide, to said first application, said first value according to said first data type as a first response to said first request, wherein said management server provides, to said second application, said first value according to said second data type as a second response to said second request.

15. The system of claim 14, wherein said configuration data in said data store is in the form of eXtensible Markup Language (XML) and each of said first schema and said second schema are specified according to XML Schema Definition (XSD) format.

16. The system of claim 15, wherein for said examine, said developer system is operable to:

convert said first schema into a set of Java Architecture for XML Binding (JAXB) classes; and inspect said set of JAXB classes to determine said first set of parameters and said corresponding data type for each of said first set of parameters.

17. The system of claim 16, wherein said application server is implemented to support Java Management Extensions (JMX), said management server is implemented as a management bean (MBean) server and wherein each of said first set of management interfaces and said second set of management interfaces is provided as a corresponding MBean.

* * * * *

UNITED STATES PATENT AND TRADEMARK OFFICE
CERTIFICATE OF CORRECTION

| | |
|---|---|
| PATENT NO. | : 9,043,447 B2 |
| APPLICATION NO. | : 13/118589 |
| DATED | : May 26, 2015 |
| INVENTOR(S) | : Bijja |

Page 1 of 1

It is certified that error appears in the above-identified patent and that said Letters Patent is hereby corrected as shown below:

In drawings, sheet 2 of 11, figure 2, under Reference Numeral 270, line 1, delete "Adminstrator" and insert -- Administrator --, therefor.

Column 2, line 47, after "from" delete "a" and insert -- an --, therefor.

Column 6, line 34, delete "is RegenerateData" and insert -- isRegenerateData --, therefor.

Column 6, line 38, delete "that that" and insert -- that --, therefor.

Column 6, line 46, delete "is RegenerateData" and insert -- isRegenerateData --, therefor.

Column 7, line 2, delete "is RegenerateData" and insert -- isRegenerateData) --, therefor.

Column 7, line 20, delete "(FIG." and insert -- FIGS. --, therefor.

Column 7, line 43, delete "is RegenerateData" and insert -- isRegenerateData --, therefor.

Column 8, line 12, delete "7. Digital Processing System" and insert -- 8. Digital Processing System --, therefor.

Column 9, line 48, delete "7. Conclusion" and insert -- 9. Conclusion --, therefor.

Signed and Sealed this
Ninth Day of February, 2016

Michelle K. Lee
*Director of the United States Patent and Trademark Office*